US012782321B2

(12) United States Patent
Jiang et al.

(10) Patent No.: US 12,782,321 B2
(45) Date of Patent: Nov. 3, 2026

(54) ULTRASONIC TRANSDUCER ARRAY AND ULTRASOUND PROBE

(71) Applicant: Qisda Corporation, Taoyuan (TW)

(72) Inventors: Fu-Sheng Jiang, Taoyuan City (TW); Pei-Lun Song, Taoyuan City (TW)

(73) Assignee: Qisda Corporation, Taoyuan City (TW)

( * ) Notice: Subject to any disclaimer, the term of this patent is extended or adjusted under 35 U.S.C. 154(b) by 227 days.

(21) Appl. No.: 18/937,067

(22) Filed: Nov. 5, 2024

(65) Prior Publication Data

US 2025/0146978 A1 May 8, 2025

(30) Foreign Application Priority Data

Nov. 7, 2023 (TW) ................................ 112142840

(51) Int. Cl.
*G01N 29/24* (2006.01)
*G01N 29/26* (2006.01)

(52) U.S. Cl.
CPC ......... *G01N 29/2418* (2013.01); *G01N 29/26* (2013.01); *G01N 2291/106* (2013.01)

(58) Field of Classification Search
CPC ............... G01N 29/2418; G01N 29/26; G01N 2291/106
See application file for complete search history.

(56) References Cited

U.S. PATENT DOCUMENTS 6,994,674 B2 * 2/2006 Sheljaskow ............ A61B 8/483 600/459
7,830,069 B2 * 11/2010 Lukacs ................. B06B 1/0622 310/334
8,372,680 B2 * 2/2013 Chen .................... A61B 8/4488 257/246
8,961,422 B2 * 2/2015 Osawa ..................... A61B 8/12 600/447
2006/0058672 A1 3/2006 Klepper
2009/0093722 A1 * 4/2009 Takeuchi ............ G01S 15/8979 600/459
2024/0310209 A1 * 9/2024 Akkaraju ............... G01H 11/08

FOREIGN PATENT DOCUMENTS

CN 104337545 2/2015
CN 114190976 7/2023
CN 116997297 11/2023

* cited by examiner

*Primary Examiner* — Toan N Pham
(74) *Attorney, Agent, or Firm* — JCIPRNET

(57) ABSTRACT

An ultrasonic transducer array including a plurality of transducers is provided. The transducers are arranged in an array along an arrangement direction and include a plurality of first transducers and a plurality of second transducers. Every two first transducers of the first transducers sequentially form a plurality of first channels along the arrangement direction. Every m second transducers of the second transducers sequentially form a plurality of second channels along the arrangement direction, where m≥2. The first transducers and the second transducers are arranged staggeredly along the arrangement direction. A first pitch between any two adjacent first channels in the first channels is less than a second pitch between any two adjacent second channels in the second channels. A resolution of the first channels being driven to scan is lower than a resolution of the second channels being driven to scan. An ultrasound probe is also provided.

20 Claims, 5 Drawing Sheets

ULTRASONIC TRANSDUCER ARRAY AND ULTRASOUND PROBE

CROSS-REFERENCE TO RELATED APPLICATION

This application claims the priority benefit of Taiwan application serial no. 112142840, filed on Nov. 7, 2023. The entirety of the above-mentioned patent application is hereby incorporated by reference herein and made a part of this specification.

BACKGROUND

Technical Field

The disclosure relates to a transducer array and a probe, and particularly relates to an ultrasonic transducer array and an ultrasound probe.

Description of Related Art

Typical ultrasound imaging uses an ultrasound probe to simultaneously receive and transmit an ultrasound signal for producing an ultrasound image. However, due to limitations in system design, the lateral resolution of the ultrasound image is usually weaker than the axial resolution, causing proportional distortion of the image and even errors, thereby affecting medical diagnosis.

SUMMARY

The disclosure provides an ultrasonic transducer array and an ultrasound probe, which can simultaneously meet the requirement of a high-resolution scan image and reduce the problem of proportional distortion of the scan image.

An embodiment of the disclosure provides an ultrasonic transducer array, which includes a plurality of transducers. The transducers are arranged in an array along an arrangement direction and include a plurality of first transducers and a plurality of second transducers. Every two first transducers of the first transducers sequentially form a plurality of first channels along the arrangement direction. Every m second transducers of the second transducers sequentially form a plurality of second channels along the arrangement direction, where m≥2. The first transducers and the second transducers are arranged staggeredly along the arrangement direction. A first pitch between any two adjacent first channels in the first channels is less than a second pitch between any two adjacent second channels in the second channels. A resolution of the first channels being driven to scan is lower than a resolution of the second channels being driven to scan.

An embodiment of the disclosure provides an ultrasound probe, which includes a casing, an ultrasonic transducer array, and a control circuit. The ultrasonic transducer array is disposed in the casing and includes a plurality of transducers. The transducers are arranged in an array along an arrangement direction and include a plurality of first transducers and a plurality of second transducers. Every two first transducers of the first transducers sequentially form a plurality of first channels along the arrangement direction. Every m second transducers of the second transducers sequentially form a plurality of second channels along the arrangement direction, where m≥2. The first transducers and the second transducers are arranged staggeredly along the arrangement direction. A first pitch between any two adjacent first channels in the first channels is less than a second pitch between any two adjacent second channels in the second channels. A resolution of the first channels being driven to scan is lower than a resolution of the second channels being driven to scan. The control circuit is electrically connected to the ultrasonic transducer array and configured to control the ultrasonic transducer array to receive and/or send a signal.

Based on the above, in an embodiment of the disclosure, the ultrasonic transducer array and the ultrasound probe include the plurality of transducers, and the transducers include the plurality of first transducers and the plurality of second transducers. The first pitch between the first channels composed of the first transducers is less than the second pitch between the second channels composed of the second transducers, so that the resolution of the first channels being driven to scan is lower than the resolution of the second channels being driven to scan. Therefore, the ultrasonic transducer array can be used to scan the object for scanning requirements, so that the ultrasonic transducer array and the ultrasound probe can simultaneously meet the requirement of a high-resolution scan image and reduce the problem of proportional distortion of the scan image.

DESCRIPTION OF THE EMBODIMENTS

Figure 1:
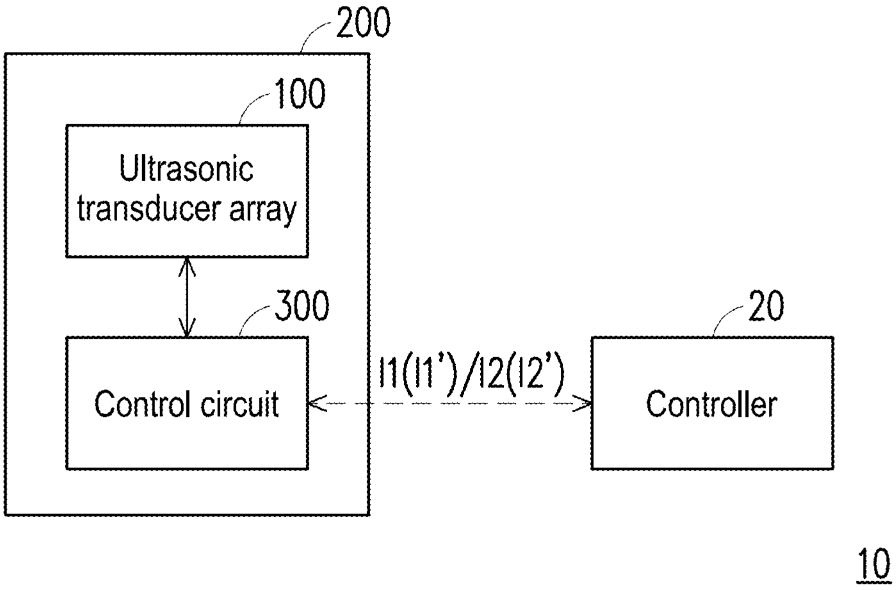
FIG. 1 is a schematic diagram of an ultrasound probe according to an embodiment of the disclosure.
Figure 2:
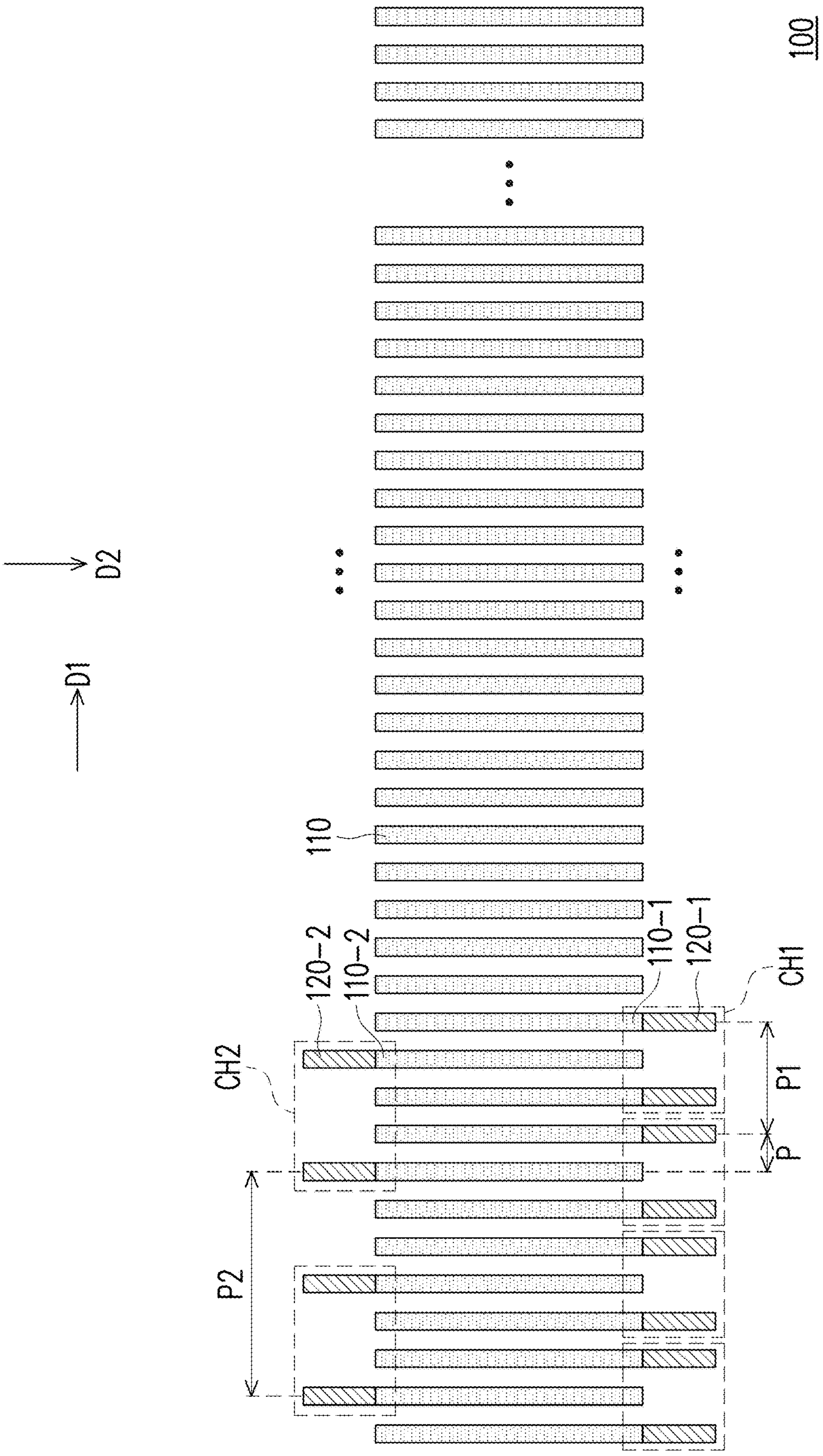
FIG. 2 is a schematic diagram of an ultrasonic transducer array according to a first embodiment of the disclosure.

FIG. 1 is a schematic diagram of an ultrasound probe according to an embodiment of the disclosure. FIG. 2 is a schematic diagram of an ultrasonic transducer array according to a first embodiment of the disclosure. Referring to FIG. 1 and FIG. 2, an embodiment of the disclosure provides an ultrasound probe 10, which includes a casing 200, an ultrasonic transducer array 100, and a control circuit 300.

In the embodiment, the ultrasonic transducer array 100 is disposed in the casing 200 and includes a plurality of transducers 110. Any transducer 110 in the ultrasonic transducer array 100 is composed of a piezoelectric ceramic material or a plurality of micromachined ultrasonic transducer (MUT) units, but the disclosure is not limited thereto. Additionally, the micromachined ultrasound transducers in any transducer 110 may be arranged in a one-dimensional array or a two-dimensional matrix.

In the embodiment, the transducers 110 are arranged in an array along an arrangement direction D1. For example, FIG. 2 illustrates that the transducers 110 are arranged in a 1×n array, where n is the number of the transducers 110. The array formed by arranging the transducers 110 can be located on a same plane or on any curved surface. Furthermore, the transducers 110 include a plurality of first transducers 110-1 and a plurality of second transducers 110-2. Every two first transducers 110-1 of the first transducers 110-1 sequentially form a plurality of first channels CH1 along the arrangement direction D1. Every m second transducers 110-2 of the second transducers 110-2 sequentially form a plurality of second channels CH2 along the arrangement direction D1, where m≥2. For example, FIG. 2 shows m=2.

In the embodiment, the first transducers 110-1 and the second transducers 110-2 are arranged staggeredly along the arrangement direction D1. In the transducers 110, two first transducers 110-1 are disposed between any two adjacent second transducers 110-2. In any first channel CH1, a second transducer 110-2 is disposed between the first transducers 110-1. There is no transducer 110 disposed between the two most adjacent first transducers 110-1 in any two adjacent first channels CH1.

In the embodiment, a first pitch P1 between any two adjacent first channels CH1 in the first channels CH1 is less than a second pitch P2 between any two adjacent second channels CH2 in the second channels CH2. The first pitch P1 is three times a minimum pitch P between any two adjacent transducers 110 in the transducers 110. The second pitch P2 is m times the first pitch P1. The second pitch P2 is 3×m times the minimum pitch P between any two adjacent transducers 110 in the transducers 110. For example, in FIG. 2, m=2, P2=2×P1, P1=3×P, P2=6×P.

In the embodiment, the transducers 110 further include a plurality of first electrical connection straps 120-1 and a plurality of second electrical connection straps 120-2. The first electrical connection straps 120-1 are electrically connected to the first transducers 110-1 respectively, and the second electrical connection straps 120-2 are electrically connected to the second transducers 110-2 respectively. The first electrical connection straps 120-1 and the second electrical connection straps 120-2 are respectively configured on two sides of the transducers 110 along an extension direction D2, where the extension direction D2 is perpendicular to the arrangement direction D1.

In the embodiment, a resolution of the first channels CH1 being driven to scan is lower than a resolution of the second channels CH2 being driven to scan. In detail, the resolution of the first channels CH1 is 2×F1×DF/2, where F1=FD/A1, FD is the focus depth, A1 is the aperture formed by the first channels CH1, A1=P1×CH, P1 is the first pitch, CH is the sum of the number of the first channels CH1 and the second channels CH2, DF is the focal depth of the system, and λ is the oscillation wavelength after the transducers 110 are driven. The resolution of the second channels CH2 is 2×F2×DF/2, where F2=FD/A2, A2 is the aperture formed by the second channels CH2, A2=P2×CH, and P2 is the second pitch.

Taking the transducers 110 of FIG. 2 as an example, since P2=2×P1, the resolution of the second channels CH2 is two times the resolution of the first channels CH1.

In the embodiment, the control circuit 300 is electrically connected to the ultrasonic transducer array 100 to control the ultrasonic transducer array 100 to receive and/or transmit a signal. The control circuit 300 controls the transducers 110 through, for example, the first electrical connection straps 120-1 and the second electrical connection straps 120-2 to control the ultrasonic transducer array 100 to receive and/or send the signal.

In the embodiment, the control circuit 300 includes, for example, a microcontroller unit (MCU), a central processing unit (CPU), a microprocessor, a digital signal processor (DSP), a programmable controller, a programmable logic device (PLD), a multiplexer (MUX), or other similar devices, or a combination thereof, and the disclosure is not limited thereto. In addition, in an embodiment, each function of the control circuit 300 may be implemented as a plurality of program codes. These program codes will be stored in the memory, and the control circuit 300 will execute these program codes. Alternatively, in an embodiment, each function of the control circuit 300 may be implemented as one or a plurality of circuits. The disclosure is not limited to using software or hardware to implement each function of the control circuit 300.

Figure 3:
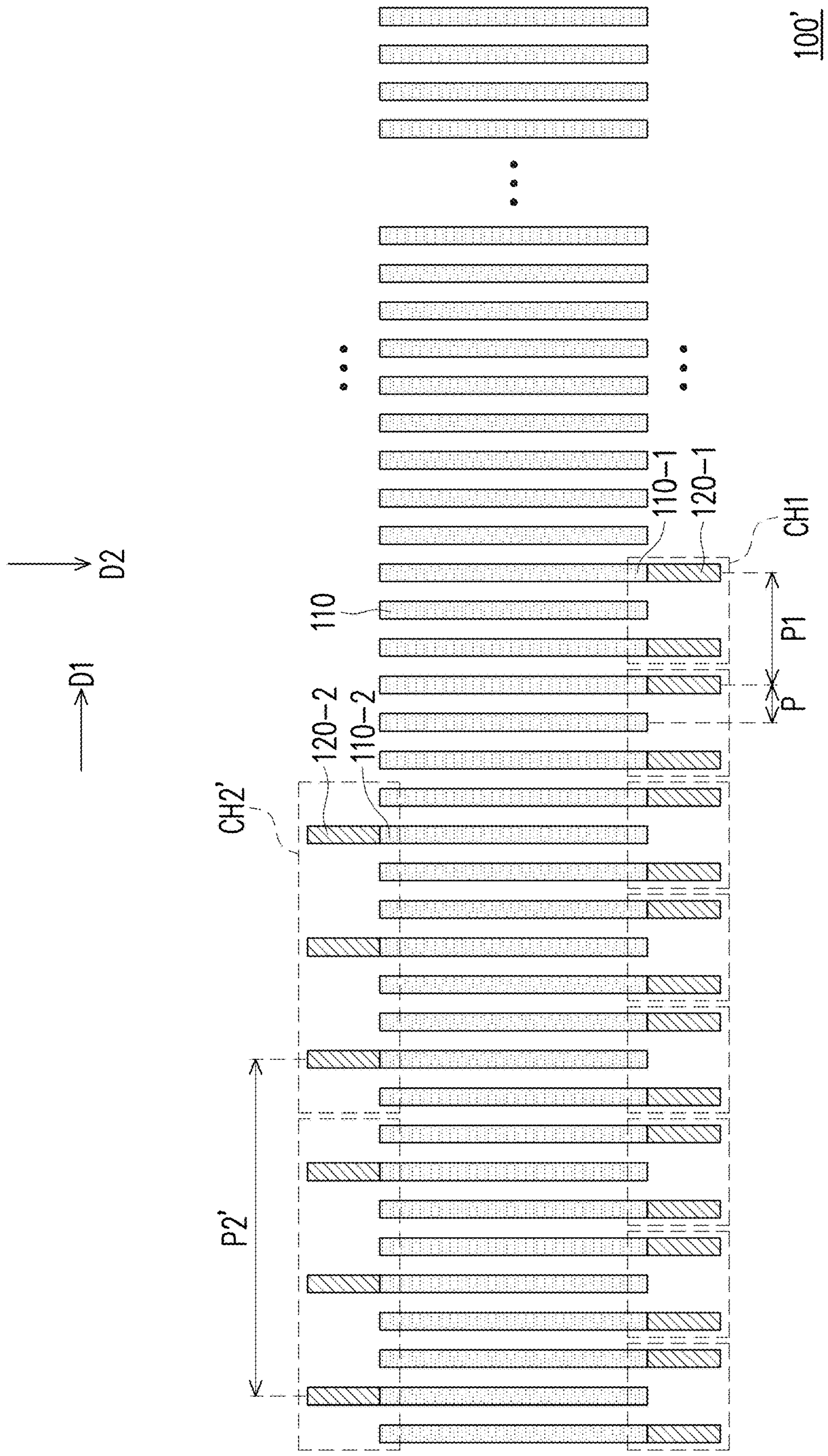
FIG. 3 is a schematic diagram of an ultrasonic transducer array according to a second embodiment of the disclosure.

FIG. 3 is a schematic diagram of an ultrasonic transducer array according to a second embodiment of the disclosure. Referring to FIG. 3, an ultrasonic transducer array 100' of FIG. 3 is similar to the ultrasonic transducer array 100 of FIG. 2. The main differences are as follows. In the embodiment, m=3, P2'=3×P1, P1=3×P, P2'=9×P, where P2' is the second pitch between any two adjacent second channels CH2' in the second channels CH2'. Therefore, the resolution of the second channels CH2' is three times the resolution of the first channels CH1.

Figure 4:
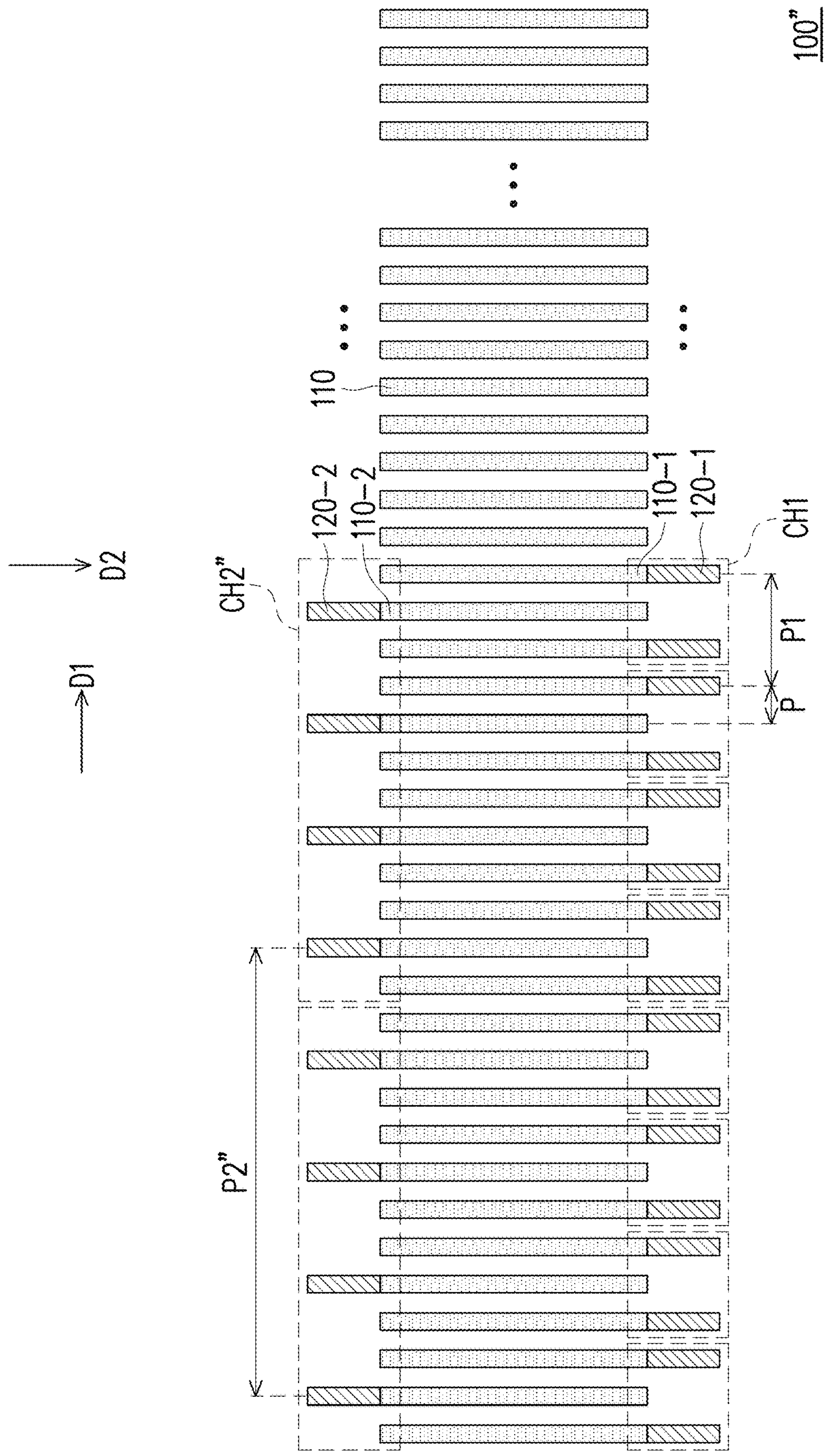
FIG. 4 is a schematic diagram of an ultrasonic transducer array according to a third embodiment of the disclosure.

FIG. 4 is a schematic diagram of an ultrasonic transducer array according to a third embodiment of the disclosure. Referring to FIG. 4, an ultrasonic transducer array 100" of FIG. 4 is similar to the ultrasonic transducer array 100 of FIG. 2. The main differences are as follows. In the embodiment, m=4, P2"=4×P1, P1=3×P, P2"=12×P, where P2" is the second pitch between any two adjacent second channels CH2" in the second channels CH2". Therefore, the resolution of the second channels CH2" is four times the resolution of the first channels CH1.

Figure 5:
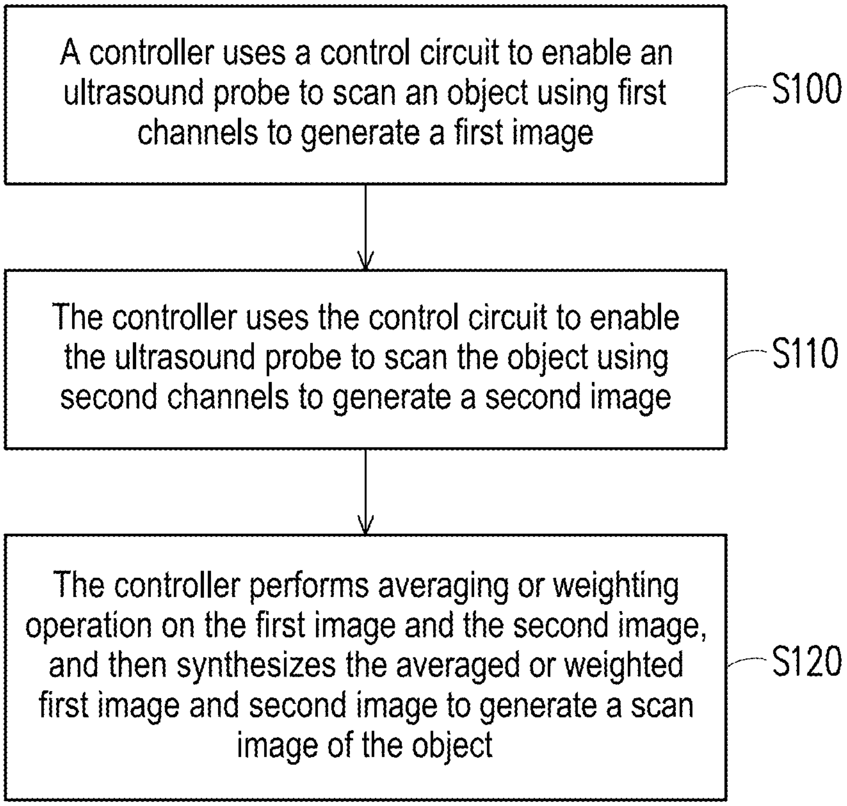
FIG. 5 is a flowchart of generating a scan image by an ultrasound probe according to an embodiment of the disclosure.

FIG. 5 is a flowchart of generating a scan image by an ultrasound probe according to an embodiment of the disclosure. Referring to FIG. 1 and FIG. 5, in the embodiment, the ultrasound probe 10 is adapted to cooperate with a controller 20 to scan the object. The controller 20 is adapted to be electrically connected to the control circuit 300.

In the embodiment, the controller 20 includes, for example, a microcontroller unit (MCU), a central processing unit (CPU), a microprocessor, a digital signal processor (DSP), a programmable controller, a programmable logic device (PLD), or other similar devices, or a combination thereof, and the disclosure is not limited thereto. In addition, in an embodiment, each function of the controller 20 may be implemented as a plurality of program codes. These program codes will be stored in the memory, and the controller 20 will execute these program codes. Alternatively, in an embodiment, each function of the controller 20 may be implemented as one or a plurality of circuits. The disclosure is not limited to using software or hardware to implement each function of the controller 20.

In the embodiment, generating the scan image by the ultrasound probe 10 includes the following steps. Step S100: The controller 20 uses the control circuit 300 to enable the ultrasound probe 10 to scan the object using the first channels CH1 to generate a first image I1. Step S110: The controller 20 uses the control circuit 300 to enable the ultrasound probe 10 to scan the object using the second channels CH2 to generate a second image I2. Step S120: The controller 20 performs averaging or weighting operation on the first image I1 and the second image I2, and then synthesizes the averaged or weighted first image I1 and second image I2 to generate the scan image of the object.

For example, although the resolution of the first channels CH1 is less than the resolution of the second channels CH2, the first image I1 generated by the first channels CH1 is less likely to generate artifacts. Therefore, when there are many artifacts in the second image I2, the number of times the object is scanned using the first channels CH1 can be increased, or the weight of the first image I1 can be increased. Or, for example, when scanning subcutaneous tissue requires higher resolution, the number of times the object is scanned using the second channels CH2 can be increased, or the weight of the second image I2 can be increased.

In the embodiment, at least one of the first image I1 and the second image I2 includes a plurality of sub-images I1' and I2'. The controller 20 uses the control circuit 300 to enable the ultrasound probe 10 to scan the object a plurality of times in different directions to generate these sub-images I1' and I2'. For example, scanning in a direction perpendicular to the surface of the object can generate rectangular sub-images I1' and I2'. Scanning the object in other directions can generate trapezoidal sub-images I1' and I2'.

To sum up, in an embodiment of the disclosure, the ultrasonic transducer array and the ultrasound probe include the plurality of transducers, and the transducers include the plurality of first transducers and the plurality of second transducers. Every two first transducers of the first transducers sequentially form the plurality of first channels along the arrangement direction. Every m second transducers of the second transducers sequentially form the plurality of second channels along the arrangement direction. The first pitch between any two adjacent first channels in the first channels is less than the second pitch between any two adjacent second channels in the second channels, so that the resolution of the first channels being driven to scan is lower than the resolution of the second channels being driven to scan. Therefore, the ultrasonic transducer array can be used to scan the object for scanning requirements. For example, when high resolution is required, the second channels can be used to scan more times or the scan image of the second channels can have a higher weight. On the contrary, the first channels can be used to scan more times or the scan image of the first channels can have a higher weight. Therefore, the ultrasonic transducer array and the ultrasound probe can simultaneously meet the requirement of a high-resolution scan image and reduce the problem of proportional distortion of the scan image.

What is claimed is:

1. An ultrasonic transducer array, comprising:
- a plurality of transducers, arranged in an array along an arrangement direction, wherein the transducers comprise:
  - a plurality of first transducers, wherein every two first transducers sequentially form a plurality of first channels along the arrangement direction; and
  - a plurality of second transducers, wherein every m second transducers sequentially form a plurality of second channels along the arrangement direction, where m≥2,
- wherein the first transducers and the second transducers are arranged staggeredly along the arrangement direction,
- wherein a first pitch between any two adjacent first channels in the first channels is less than a second pitch between any two adjacent second channels in the second channels,
- wherein a resolution of the first channels being driven to scan is lower than a resolution of the second channels being driven to scan.

2. The ultrasonic transducer array according to claim 1, wherein two first transducers are disposed between any two adjacent second transducers in the transducers.

3. The ultrasonic transducer array according to claim 1, wherein a second transducer is disposed between the first transducers in any first channel.

4. The ultrasonic transducer array according to claim 1, wherein there is no transducer disposed between two most adjacent first transducers in any two adjacent first channels.

5. The ultrasonic transducer array according to claim 1, wherein the first pitch is 3 times a minimum pitch between any two adjacent transducers in the transducers.

6. The ultrasonic transducer array according to claim 1, wherein the second pitch is m times the first pitch.

7. The ultrasonic transducer array according to claim 1, wherein the second pitch is 3×m times a minimum pitch between any two adjacent transducers in the transducers.

8. The ultrasonic transducer array according to claim 1, wherein any one of the transducers is composed of a plurality of micromachined ultrasonic transducer units.

9. The ultrasonic transducer array according to claim 1, wherein the transducers further comprise a plurality of first electrical connection straps and a plurality of second electrical connection straps, the first electrical connection straps are electrically connected to the first transducers respectively, and the second electrical connection straps are electrically connected to the second transducers respectively.

10. The ultrasonic transducer array according to claim 9, wherein the first electrical connection straps and the second electrical connection straps are respectively configured on two sides of the transducers along an extension direction, and the extension direction is perpendicular to the arrangement direction.

11. An ultrasound probe, comprising:
- a casing;
- an ultrasonic transducer array, disposed in the casing, and comprising:
  - a plurality of transducers, arranged in an array along an arrangement direction, wherein the transducers comprise:
    - a plurality of first transducers, wherein every two first transducers sequentially form a plurality of first channels along the arrangement direction; and
    - a plurality of second transducers, wherein every m second transducers sequentially form a plurality of second channels along the arrangement direction, where m≥2,
  - wherein the first transducers and the second transducers are arranged staggeredly along the arrangement direction,
  - wherein a first pitch between any two adjacent first channels in the first channels is less than a second pitch between any two adjacent second channels in the second channels,
  - wherein a resolution of the first channels being driven to scan is lower than a resolution of the second channels being driven to scan; and
- a control circuit, electrically connected to the ultrasonic transducer array, and configured to control the ultrasonic transducer array to receive and/or send a signal.

12. The ultrasound probe according to claim 11, wherein two first transducers are disposed between any two adjacent second transducers in the transducers.

13. The ultrasound probe according to claim 11, wherein a second transducer is disposed between the first transducers in any first channel.

14. The ultrasound probe according to claim 11, wherein the first pitch is three times a minimum pitch between any two adjacent transducers in the transducers.

15. The ultrasound probe according to claim 11, wherein the second pitch is m times the first pitch.

16. The ultrasound probe according to claim 11, wherein the second pitch is 3×m times a minimum pitch between any two adjacent transducers in the transducers.

17. The ultrasound probe according to claim 11, wherein the transducers further comprise a plurality of first electrical connection straps and a plurality of second electrical connection straps, the first electrical connection straps are electrically connected to the first transducers respectively, and the second electrical connection straps are electrically connected to the second transducers respectively.

18. The ultrasound probe according to claim 17, wherein the first electrical connection straps and the second electrical connection straps are respectively configured on two sides of the transducers along an extension direction, and the extension direction is perpendicular to the arrangement direction.

19. The ultrasound probe according to claim 11, wherein the ultrasound probe is adapted to cooperate with a controller to scan an object, and the controller is adapted to be electrically connected to the control circuit, wherein:

the controller uses the control circuit to enable the ultrasound probe to scan the object using the first channels to generate a first image;

the controller uses the control circuit to enable the ultrasound probe to scan the object using the second channels to generate a second image; and the controller performs averaging or weighting operation on the first image and the second image, and then synthesizes the averaged or weighted first image and second image to generate a scan image of the object.

20. The ultrasound probe according to claim 19, wherein at least one of the first image and the second image comprises a plurality of sub-images, and the controller uses the control circuit to enable the ultrasound probe to scan the object a plurality of times in different directions to generate the sub-images.

* * * * *